Aug. 31, 1948.  E. P. TURNER  2,448,500
BEARING ASSEMBLY FOR DYNAMOELECTRIC MACHINES
Filed April 23, 1945

Inventor
Edgar P. Turner
By William P. Stewart
Attorney

Witness:
Godfrey Pecina

Patented Aug. 31, 1948

2,448,500

UNITED STATES PATENT OFFICE 2,448,500

BEARING ASSEMBLY FOR DYNAMO-ELECTRIC MACHINES

Edgar P. Turner, Fanwood, N. J., assignor to The Singer Manufacturing Company, Elizabeth, N. J., a corporation of New Jersey Application April 23, 1945, Serial No. 589,779

10 Claims. (Cl. 308—72)

This invention relates to dynamoelectric machines and more particularly to bearing structures for small electric motors adapted to furnish the driving power for sewing machines, typewriters, fans and similar apparatus.

Heretofore, in motors of this type, it has been customary to provide a bearing retainer which is secured to the end-cover by means of rivets or lugs formed on the retainer and pushed through suitable apertures in the end-cover and then bent over or deformed in a manner to secure said retainer more or less permanently to said end-cover. This securing operation, usually performed on a small press, often results in cracked or broken-end-covers particularly when they are made from plastic insulating materials and, in case of inadvertent assembly of a defective bearing, the permanency of the retainer assembly makes it very difficult if not impossible to salvage the end-covers and retainers.

It is an object of this invention, therefore, to provide an improved bearing construction for small electric motors in which a spring retainer therefor is simply and removably secured to the end-cover and does not require special fastening means nor permanent deformation of the parts to effect such a securement.

Another difficulty with these prior rivet or bent-over-lug methods of securing a bearing retainer is that, with such construction, the retainer is not given the opportunity to adjust itself to a full-seated coaxial relation with the bearing bushing. Thus, initial undesirable off-center conditions are "locked-up" in the assembly.

It is a further object of this invention, therefore, to provide a bearing construction which will produce and maintain a self-centering of the bushing within the retainer seat.

With the above and other objects in view, as will hereinafter appear, the invention comprises the devices, combinations and arrangements of parts hereinafter set forth and illustrated in the accompanying drawings of a preferred embodiment of the invention, from which the several features thereof and the advantages attained thereby will be readily understood by those skilled in the art.

Figure 1:
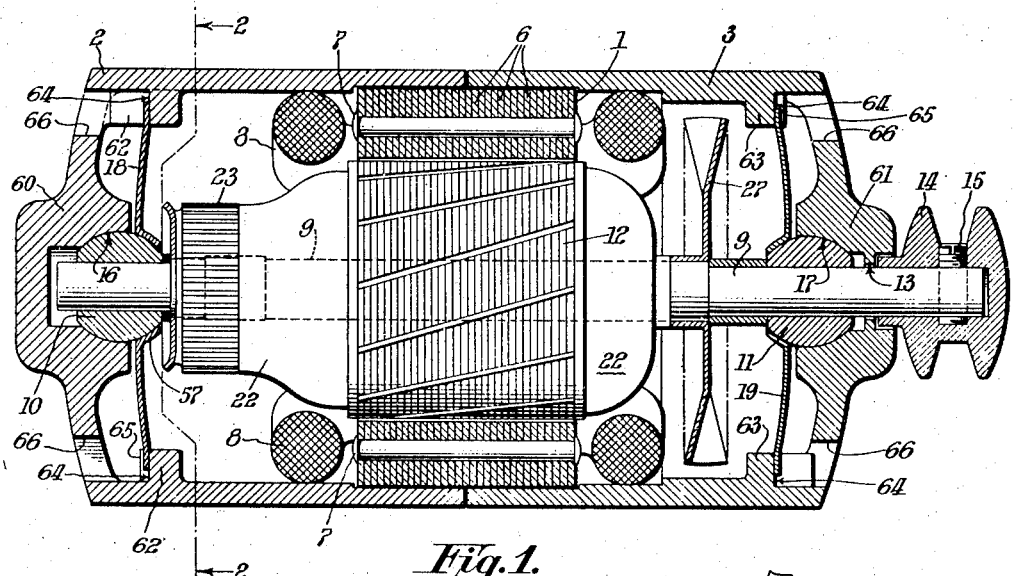
Figure 2:
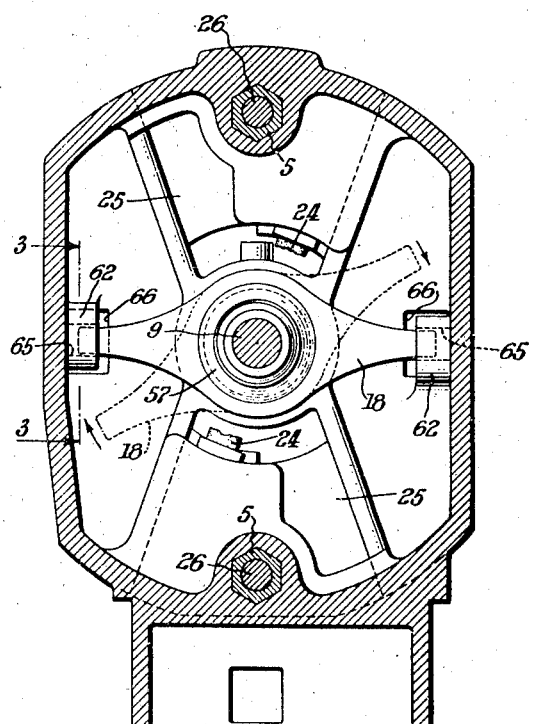
Figure 3:
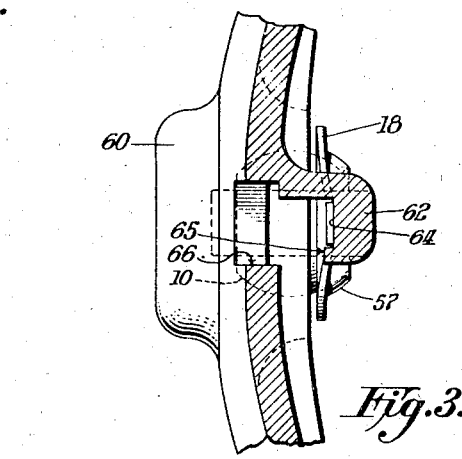
Figure 4:
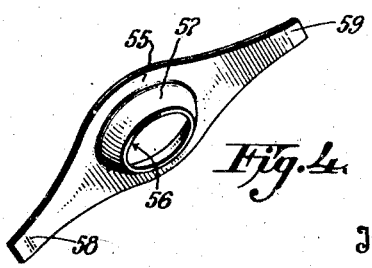

In the accompanying drawings, Fig. 1 is a longitudinal sectional view taken through an electric motor embodying the invention. Fig. 2 is a sectional view, partly in elevation, taken on line 2—2 of Fig. 1. Fig. 3 is an enlarged sectional view taken on line 3—3 of Fig. 2. Fig. 4 is a detail perspective view of a spring bearing retainer employed in the motor of Fig. 1.

The motor is constructed with a stator core 1 held in clamped relation between end-covers 2 and 3, preferably of molded insulating material, by means of screws (not shown) which extend longitudinally through the parts and are threaded into bushings 5—5 removably carried in recesses in the end-cover 2. The stator core 1 is made up of thin stacked magnetic laminations 6 held together generally by rivets 7, and carries current-conducting field coil windings 8 thereon as is well known in the art. A shaft 9 journaled in self-aligning bearings 10 and 11 carries a rotor core 12 which is mounted for rotation in the usual manner within the stator core 1. The shaft 9 extends through an aperture 13 in the end-cover 3 and has a power take-off pulley 14 secured to its outer end by means of screw 15.

The rotor core 12 carries the usual current-conducting winding 22 connected to commutator 23 in the conventional manner. A fan 27 pressed onto a portion of the shaft 9 rotates therewith to cause ventilating air to be circulated longitudinally through the motor, as is customary with motors of this type.

For a more complete description of this motor construction, particularly of the case and core assembly, reference may be had to my copending application Serial No. 589,778, filed April 23 1945.

Brushes 24—24 bear against diametrically opposite portions of the commutator 23 to permit transfer thereto of current from an external supply circuit, as is well known in the art. Removable brush covers 25—25, held in place by screws 26—26 threaded into the bushings 5—5 give access to the brushes for examination and/or replacement thereof. For a more complete description of this brush structure, reference may be had to the copending application Serial No. 589,846, Reynold Hanpe, filed April 23, 1945, now Patent No. 2,444,826.

According to the present invention, the bearing bushings 10 and 11, preferably of the oil impregnated type, are formed with an outer spherical contour and are held within matching spherical seats 16 and 17 respectively formed in the hub portions 60 and 61 of the end-covers 2 and 3 by means of spring retainers 18 and 19.

These spring retainers are formed from flat stock and each have a central body portion 55 containing an aperture 56 defined by an arcuately struck-up edge 57 which provides a spherical seating surface. These spherical seating surfaces form extensions for each of the spherical seats 16 and 17. Extending diametrically from opposite sides of said central body portion 55 are two symmetrical limb portions 58 and 59 each of which tapers from the body width down to a relatively narrow width at its outer end as clearly seen in Fig. 4. Made preferably of spring steel, each retainer is, in longitudinal section, normally bow-shaped, with the arm portions bent backward equally from the plane of the central body portion 55 on the same side thereof as the struck-up edge portion 57.

Formed on the interior walls of each of the end-covers 2 and 3 and located diametrically on opposite sides of the respective hub portions 60 and 61 are the projecting hook-shaped fingers 62—62, 63—63, preferably molded integrally with the end-covers. Each of these fingers has a recessed seat 64 for receiving the ends of the limb portions 58 and 59 in sprung engagement therewith. A lip portion 65 prevents the retainer from being unseated by mere lateral displacement. Referring now to Figs. 1 and 2, the procedure employed in assembling these bearings is as follows:

1. Place the bearing bushing in the spherical receiving seat.
2. Place the retainer in position as shown by the dotted lines of Fig. 2 so that the spherical seat thereof is centered and seated against the bushing.
3. Push down on both limbs near the ends of the retainer and turn clockwise as indicated by the arrows in Fig. 2. This depresses said limb ends and allows them to enter behind the fingers on the end-covers.
4. Release pressure on the limbs and allow limb ends to spring back and be confined by the recessed seats 64 in latched engagement therewith. At the same time, due to the leaf-spring action of the retainer, the bearing bushing is urged resiliently into the spherical seat provided therefor in the end-cover, the reaction to this end-thrust being carried by said seats 64. This completes the assembly.

A preferred construction employs molded end-covers and, in that connection, the ventilating openings 66 are cored along with the recessed seat 64 for simplicity and easy handling. These openings 66 also serve as inspection openings to determine readily and externally whether the retainers are properly seated within the end-covers.

It will be understood that the retainers may be readily removed from engaged position by performing the assembly steps above enumerated in the reverse order.

It is to be noted that, with this construction, the outer ends of the retainer are not closely restrained against motion in either an endwise or lateral direction but may slip radially and laterally beneath the fingers. That is to say, the retainer is free within limits to adjust its longitudinal and lateral positions, and find its own center so that the bearing bushing will fully seat within the spherical seat of the retainer. This simple means of securing excellent fits in spite of dimensional variations is of extreme value in saving assembly time and decreasing spoilage, particularly in this type of small motor which is customarily subject to large quantity production.

It will be obvious to those skilled in the art that the invention may, without departure from its essential attributes, be embodied in various specific forms other than that shown and described, which latter is to be considered in all respects as illustrative of the invention and not restrictive.

Having thus set forth the nature of the invention, what I claim herein is:

1. In a dynamoelectric machine, and end-cover having a bore, a bearing bushing disposed in said bore, a spring retainer having a central seat engaging said bearing bushing and formed with radial arm portions, and hook means formed on said end-cover for engagement by said arm portions, said retainer being free within limits to move radially and laterally relative to said hook means to provide thereby a self-centering element for resiliently urging said bearing bushing into said bore.

2. In a dynamoelectric machine, an end-cover having a bore, a bearing bushing disposed in said bore, a leaf-spring retainer having a central seat engaged with said bearing bushing and formed with radial arm portions, and hook means formed with recessed seats on said end-cover, said arm portions being sprung against said recessed seats and said retainer being free for limited movement endwise and sidewise thereof relative to said hook means to provide thereby a fully-seating self-centering element for resiliently seating said bearing bushing in the bore of said end-cover.

3. In a dynamoelectric machine, an end-cover having a bore, a bearing bushing disposed in said bore, a spring retainer having a central seat engaged with said bearing bushing and formed with radial arm portions, and hook means formed on said end-cover with recessed seats against which said arm portions press in reaction against the resilient end-thrust transmitted to the bearing bushing, said retainer being free to move radially and laterally relative to said hook means to provide thereby a self-centering element for resiliently seating said bearing bushing in the bore of said end-cover.

4. In a dynamoelectric machine, an end-cover having a spherical bore located on a central axis thereof, a spherical bearing bushing disposed in said bore, a substantially flat spring retainer having a spherical seat engaging said bushing and formed with flexible radial arm portions, and hook means formed on said end-cover for engagement by said arm portions by flexing said arm portions axially and rotating them about said axis into latched position behind said hook means, said retainer being free within limits to move radially and laterally relative to said hook means to provide thereby means for aligning the spherical seat on said retainer with the central axis of said end-cover and for resiliently urging said bearing bushing centrally into the bore of said end-cover.

5. In a dynamoelectric machine, an end-cover of molded insulating material having a central bore, a bearing bushing disposed in said bore, a substantially flat spring retainer provided between its ends with a spherical seat in engagement with said bearing bushing and formed with radial arm portions, and hook means formed on said end-cover for removably holding said arm portions in latched engagement therewith, said retainer being free within limits to move radially and laterally relative to said hook means to provide thereby a self-centering element for resiliently seating said bearing bushing in the bore of said end-cover.

6. In a dynamoelectric machine, an end-cover having a bore located on an axis thereof, a bearing bushing received in said bore, a spring retainer provided between its ends with a spherical seat in engagement with said bearing bushing and formed with radial arm portions, and hook means formed on said end-cover for removably holding said arm portions in latched engagement therewith, said retainer being free to move radially and laterally relative to said hook means whereby the spherical seat thereof is shifted into coaxial relation with the axis of said end-cover to resiliently seat said bearing bushing in the bore of said end-cover.

7. In a dynamoelectric machine, a molded end-cover having a bore formed therein and located on a central axis thereof, a bearing bushing received for universal movement in said bore, a retainer having a central seat pressed against said bearing bushing and formed with flexible radial arm portions, and hook means formed on said end-cover for removable engagement by said arm portions by spring-latching said arm portions into recessed seats in said hook means, said retainer being free within limits, in latched position, to move radially and laterally relative to said hook means to provide thereby a center-seeking element to resiliently urge said bearing bushing axially into said central bore.

8. In a dynamoelectric machine, an end-cover having a central axis, a spherical bore located therein on said axis, a bearing bushing received for universal movement in said bore, a substantially flat spring retainer formed with a central portion containing a seat and with radial arm portions bent, in unsprung condition, axially away from the plane of said central portion, and hook means formed on said end-cover for engagement by said arm portions by springing said arm portions therewithin to stand more nearly in the plane of said central portion, said retainer, in engaged position being free within limits to move radially and laterally relative to said hook means, whereby the central seat thereof is shifted into coaxial relation with the axis of said end-cover to press against said bearing bushing and urge it resiliently into said axial bore.

9. In a dynamoelectric machine, an end-cover having a central axis, a spherical bore located therein on said axis, a bearing bushing received for universal movement in said bore, a substantially flat spring retainer formed with a central portion thereof containing a seat in engagement with said bearing bushing and having radial arm portions bent, in unsprung condition, axially away from the plane of said central portion, and hook elements formed on said end-cover and located on diametrically opposite sides of said central axis for removably engaging said arm portions by springing said arm portions into latched engagement with said hook elements to stand more nearly in the plane of said central portion, said retainer being, in latched position, free within limits to move radially and laterally relative to said hook elements whereby the central seat thereof is shifted into coaxial relation with the axis of said end-cover to press against said bearing bushing and urge it resiliently into said axial bore.

10. In a dynamoelectric machine, a frame including an end cover having a bearing-bushing seat, a bearing-bushing disposed in the seat of said end cover, a bearing-bushing retainer comprising a spring member disposed in engagement with said bearing-bushing and resiliently opposed to said seat, and latching means for said retainer providing for limited radial and lateral bodily movement of said retainer relative to said bearing-bushing.

EDGAR P. TURNER.

REFERENCES CITED

The following references are of record in the file of this patent:

UNITED STATES PATENTS

| Number | Name | Date |
| --- | --- | --- |
| 1,918,690 | Englehardt | July 18, 1933 |
| 2,308,609 | Koch | Jan. 19, 1943 |